(12) United States Patent
Swedish et al.

(10) Patent No.: US 10,802,583 B2
(45) Date of Patent: *Oct. 13, 2020

(54) METHODS AND APPARATUS FOR RETINAL RETROREFLECTION IMAGING

(71) Applicant: Massachusetts Institute of Technology, Cambridge, MA (US)

(72) Inventors: Tristan Swedish, Cambridge, MA (US); Karin Roesch, Cambridge, MA (US); Ramesh Raskar, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/278,100

(22) Filed: Feb. 17, 2019

(65) Prior Publication Data

US 2019/0187788 A1 Jun. 20, 2019

Related U.S. Application Data

(63) Continuation of application No. 15/142,165, filed on Apr. 29, 2016, now Pat. No. 10,248,194.

(Continued)

(51) Int. Cl.
*G06F 3/01* (2006.01)
*G06K 9/00* (2006.01)
*G06F 3/00* (2006.01)

(52) U.S. Cl.
CPC .............. *G06F 3/013* (2013.01); *G06F 3/005* (2013.01); *G06K 9/00604* (2013.01)

(58) Field of Classification Search
CPC ...... G06F 3/005; G06F 3/013; G06K 9/00604
See application file for complete search history.

(56) References Cited

U.S. PATENT DOCUMENTS 5,094,521 A 3/1992 Jolson et al.
6,027,216 A 2/2000 Guyton et al.
(Continued)

FOREIGN PATENT DOCUMENTS

WO 2014186620 A1 11/2014

OTHER PUBLICATIONS

American Academy of Pediatrics, Red Reflex Examination in Neonates, Infants, and Children, published in Pediatrics, vol. 122, No. 6, Dec. 2008.

(Continued)

*Primary Examiner* — Md N Haque
(74) *Attorney, Agent, or Firm* — Stephen R. Otis

(57) ABSTRACT

A video camera captures images of retroreflection from the retina of an eye. These images are captured while the eye rotates. Thus, different images are captured in different rotational positions of the eye. A computer calculates, for each image, the eye's direction of gaze. In turn, the direction of gaze is used to calculate the precise location of a small region of the retina at which the retroreflection occurs. A computer calculates a digital image of a portion of the retina by summing data from multiple retroreflection images. The digital image of the retina may be used for many practical applications, including medical diagnosis and biometric identification. In some scenarios, the video camera captures detailed images of the retina of a subject, while the subject is so far away that the rest of the subject's face is below the diffraction limit of the camera.

3 Claims, 8 Drawing Sheets

Related U.S. Application Data

(60) Provisional application No. 62/156,108, filed on May 1, 2015.

(56) References Cited

U.S. PATENT DOCUMENTS

| | | | |
|---|---|---|---|
| 6,542,081 B2 | 4/2003 | Torch | |
| 2004/0075743 A1* | 4/2004 | Chatani | G06F 16/5854 |
| | | | 348/207.1 |
| 2008/0002863 A1* | 1/2008 | Northcott | G06K 9/00604 |
| | | | 382/117 |
| 2010/0013873 A1* | 1/2010 | Kondo | G09G 3/2022 |
| | | | 345/691 |
| 2013/0208241 A1* | 8/2013 | Lawson | A61B 3/0091 |
| | | | 351/206 |
| 2013/0235346 A1* | 9/2013 | Huang | A61B 3/152 |
| | | | 351/208 |
| 2016/0081547 A1* | 3/2016 | Gramatikov | G06K 9/00604 |
| | | | 351/210 |

OTHER PUBLICATIONS

Samaneigo, A., MobileVision: A Portable, Scalable Retinal Imaging System, TI Engibous Competition Report, Spring 2012, http://www.ti.com/corp/docs/university/docs/Rice_University_mobileVision%20Final%20Report.pdf.

* cited by examiner

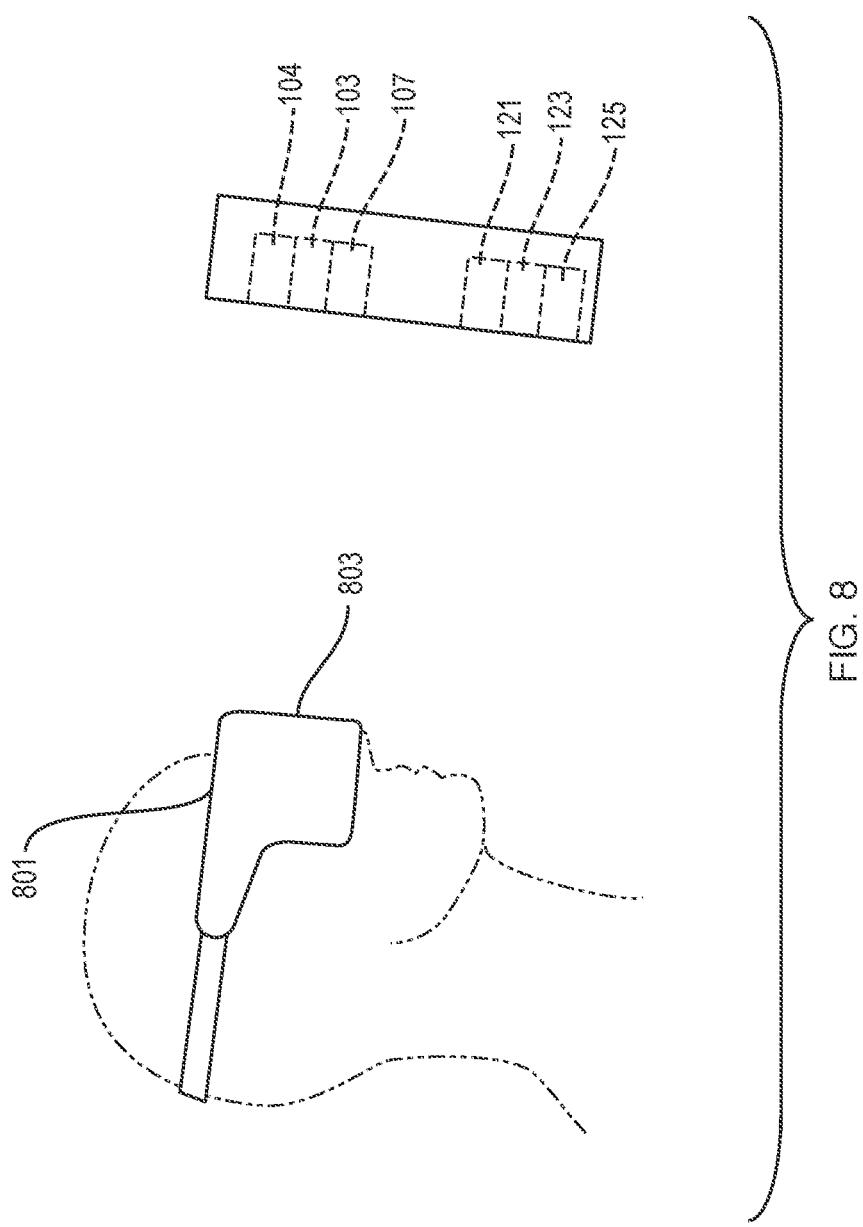

METHODS AND APPARATUS FOR RETINAL RETROREFLECTION IMAGING

RELATED APPLICATIONS

This application is a continuation of U.S. application Ser. No. 15/142,165 filed on Apr. 29, 2016, which claims the benefit of U.S. Provisional Application No. 62/156,108, filed May 1, 2015 (the "Provisional"). The entire disclosure of the Provisional is herein incorporated by reference.

STATEMENT REGARDING FEDERALLY SPONSORED RESEARCH OR DEVELOPMENT

This invention was made with government support under Contract No. W911NF-14-1-0014 awarded by the Army Research Office. The government has certain rights in the invention.

FIELD OF TECHNOLOGY

The present invention relates generally to retinal retroflection imaging.

BACKGROUND

As used herein, "retinal retroflection" or "RR" means reflection in which (i) a camera and a light source subtend an angle, from the vantage point of an eye, that is less than eight degrees; and (b) light from the light source travels to the retina of the eye, and then scatters from the retina, such that a portion of the scattered light travels to the light source and a portion of the scattered light travels to the camera.

Retinal retroflection occurs when the light source is sufficiently near the camera. This is sometimes loosely described as the camera being coaxial with the illumination. If the light source and camera are too far apart (i.e., subtend an angle, from the vantage point of the eye, that is greater than eight degrees), then the camera typically does not capture an image of retroflection from the retina.

An example of retinal retroflection is a red reflex reflection that occurs when the light source emits visible light. If the visible light includes reddish-orange light, then the red reflex reflection appears, from the vantage point of the camera, to be a reddish-orange region in the pupil of the eye. (This is a familiar phenomenon. Many camera owners have seen a red reflex effect, in which a person's pupils appear red or orange in a photograph.)

Another example of retinal retroflection is a bright pupil reflection that occurs when the light source emits infrared (IR) light or near-infrared (NIR) light. A bright pupil reflection is sometimes called a white pupil reflection.

The retinal retroflection (RR) normally appears approximately circular in shape. However, the shape of the RR may vary depending on eye conditions such as refractive aberrations or pathologies that occlude or diffuse light or that prevent reflection from the retina.

In retinal retroflection: (a) the angular distance between the camera and light source—as seen from the vantage point of the eye—is very small; (b) the eye converges light from the light source to form a blur spot on the retina; and (c) light scatters from the blur spot and travels to the camera.

SUMMARY

In illustrative implementations of this invention, a video camera captures retinal retroreflection images (RR images). The RR images show retroreflection from the retina. The RR images are captured while the eye rotates. Thus, different RR images are captured in different rotational positions of the eye. The video camera captures hundreds or thousands or RR images.

A computer calculates, for each RR image, the eye's direction of gaze. For example, in some cases: (a) a projector or display screen displays a visual fixation target; and (b) a computer estimates direction of gaze based at least in part on the position of the fixation target and known or calculated geometry of the scene. In other cases, a fixation target is not used. Instead, a viewer watches ordinary visual content (e.g., a movie or video game) while an eye tracker detects direction of gaze.

In many implementations, direction of gaze is used to calculate the precise location of a very small region of the retina at which the retroflection occurs.

In many cases, a computer calculates a digital image of a portion of the retina by combining data from multiple RR images. For example, a computer may sum, for each respective pixel of the digital image, a set of light intensities that correspond to the respective pixel and that are recorded in the RR images.

The digital image (also called a "reconstructed" image) may be used for many practical applications, including medical diagnosis and biometric identification.

In many cases, the RR images are captured while the video camera is far away from the eye. For example, the distance between video camera and eye may be greater than ten centimeters, or greater than 500 cm, or greater than one meter, or greater than three meters, or greater than ten meters, or greater than 100 meters, or greater than 1000 meters.

Indeed, in some cases, the video camera captures clear, detailed images of the retina of a subject, while the subject is so far away (e.g., thousands of meters) that the rest of the subject's face is not discernable, because it is below the diffraction limit of the camera. In some cases, the camera has only a single pixel, and captures RR images while the camera is at a distance of more than 15 meters.

In some cases, the RR images are used to determine the direction of gaze. For example, a video camera may capture a sequence of RR images of a retina of a person's eye. A computer may then compare this sequence to a database of known sequences of RR images of the same retina of the same person that were taken at known directions of gaze. Based on this comparison, a computer calculates the direction of gaze.

The description of the present invention in the Summary and Abstract sections hereof is just a summary. It is intended only to give a general introduction to some illustrative implementations of this invention. It does not describe all of the details and variations of this invention. Likewise, the description of this invention in the Field of Technology section is not limiting; instead it identifies, in a general, non-exclusive manner, a technology to which exemplary implementations of this invention generally relate. Likewise, the Title of this document does not limit the invention in any way; instead the Title is merely a general, non-exclusive way of referring to this invention. This invention may be implemented in many other ways.

BRIEF DESCRIPTION OF THE DRAWINGS

FIG. 8 shows a user wearing an augmented reality (AR) device, while a light source illuminates the retina of an eye and a video camera captures RR images.

Figure 1:
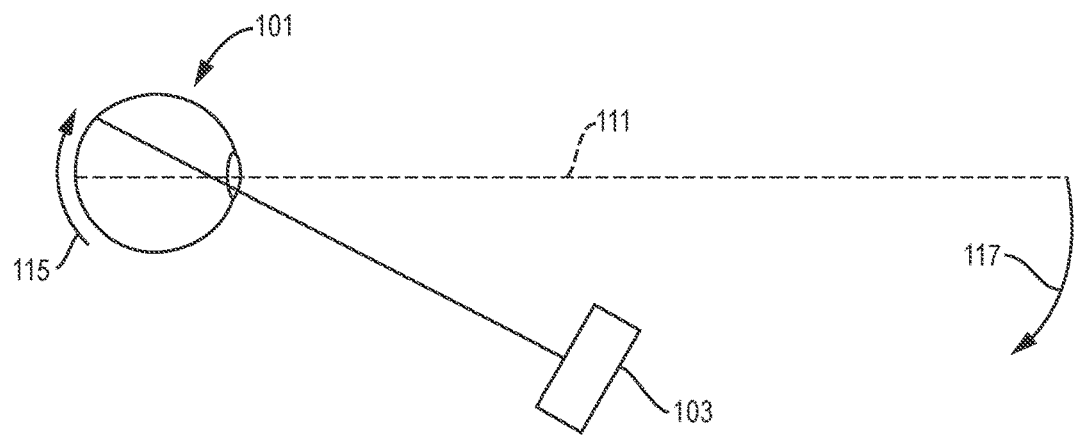
FIG. 1 shows an eye rotating while a video camera captures RR images.

The above Figures show some illustrative implementations of this invention, or provide information that relates to those implementations. However, this invention may be implemented in many other ways.

DETAILED DESCRIPTION

General

In illustrative implementations of this invention, a camera captures retinal retroflection images (RR images) of an eye as the eye rotates. For example, the camera may capture tens, hundreds or thousands of RR images. Each of the images is taken at a different rotational position of the eye. While the camera captures the images, a light source illuminates the eye.

In some implementations, the light source illuminates the eye with visible light, and the retinal retroreflection appears in each image as a reddish-orange region in the pupil of the eye. In other implementations, the light source illuminates the eye with infrared light, and the retinal retroreflection appears in each image as a so-called bright pupil (also know as white pupil).

The retinal retroreflection that is captured in each RR image comprises light reflecting from a very small region of the retina (an "RR region"). For example, in some cases, a diffraction limited eye with pupil diameter of 4 mm creates a RR region with a diameter of 5 microns. In some cases, a RR region has a diameter between 4-10 microns. The diameter of the RR region may be greater if the eye has refractive aberrations. The RR region includes all or part of the blur circle formed by the focused light from the so-called coaxial light source. In some cases, multiple sweeps, each along a different path, are performed to capture RR images of a wide region of the retina.

In illustrative implementations, the position of the RR region varies from image to image, due to the fact that the rotational position of the eye varies from image to image.

In illustrative implementations, an individual RR image does not look like a zoomed version of a very small portion of the retina. Instead, if the camera has multiple pixels, each pixel of an RR image records light scattered at a different angle from a roughly lambertian reflector during retinal retroreflection. This roughly lambertian reflector is the very small RR region for that image.

In many implementations of this invention, a computer determines the rotational position (direction of gaze) of the eye for each of the images, respectively. The computer makes this determination based, at least in part, on sensor readings.

Then, for each image, the computer determines the position of the RR region: i.e., where the RR region is located in the retina. The computer makes this determination (of the position of the RR region) based on the eye's rotational position and on known or calculated geometry of the scene. For example, the known or calculated geometry of the scene may comprise data that describes the positions and orientation of the camera and a visual fixation target and that describes the positions or orientation of the subject's head. This data is derived from sensor measurements or is known from prior calibration.

Preliminary Image Processing

Image processing of the video stream may begin with initial steps such as: (a) identifying and deleting frames that are blurred due to eye blink or rapid movement of the eye; and (b) cropping images. For example, a computer may process each RR image to recognize the image region that consists only of pixels that record the retinal retroreflection (the "RR image region"), and then crop the image to include only the RR image region. For example, if the retinal retroreflection appears as a reddish-orange disk, the computer may recognize the reddish-orange disk and crop the image such that the image contains only the reddish-orange disk.

Alternatively, the camera may capture images, each of which consists only of a RR image region. For example, if the retinal retroreflection appears as a reddish-orange disk, then the camera may be precisely pointed and zoomed such that each image captures only the reddish-orange disk. For example, a computer: (a) may determine, based at least in part on sensor data, the rotational position and scene depth of the eye; (b) may, based on the eye's rotational position, control an actuator to point the camera such that the camera is centered on the RR region, and (c) may, based on the scene depth of the eye, control a zoom mechanism of the camera to cause the camera to capture an image that consists only of a RR image region.

Image Reconstruction

In some cases, a computer combines data from multiple RR images, in order to create a digital image of all or a portion of the retina (a "reconstructed image"). For example, the reconstructed image may comprise an image of a large circular region of the retina, or may comprise an image of a "path"—e.g., an image of an elongated retinal region that is straight or curved.

In some cases, a computer calculates the reconstructed image by summing light intensities in a set of RR images. For example, a computer may set the intensity of a pixel of the reconstructed image equal to a sum of light intensities. For example, a computer may sum, for each respective pixel of the reconstructed image, a set of light intensities that correspond to the respective pixel and that are recorded in the RR images.

In some cases, the RR image regions overlap. That is, the RR region captured in each image partially overlaps with the RR regions captured in some other images.

In some cases, the retinal retroreflection is captured by multiple camera pixels. Each of these multiple pixels captures light scattered at a different angle from the RR region. In other cases, the camera has only a single pixel that captures an image of the entire retinal retroreflection. In either case (i.e., multiple camera pixels or a single camera pixel), images may be combined to form a reconstructed image by summing light intensities, as described above.

In some cases, the reconstructed image comprises a focused image of a retinal region in which blood vessels are visible.

Camera

A digital video camera (e.g., 103 in FIG. 2) captures the RR images. The video camera 103 may either be a CCD (charge coupled device) camera or a CMOS (complimentary metal oxide semiconductor) camera. In some cases, it is desirable for the video camera to be a CCD camera, in order to avoid skew, wobble and partial exposure artifacts that may occur due to the so-called "rolling shutter" in a CMOS camera. In other cases, it is desirable for the video camera to be a CMOS camera, in order to avoid smear artifacts that may occur due to the so-called "global shutter" in a CCD camera.

In some cases, phase locked time of flight sensors are used to reduce ambient light noise.

Light Source

In illustrative implementations, a light source (e.g., 107 in FIG. 2) illuminates the retina while the camera captures the RR image.

In illustrative implementations, the light source 107 and video camera 103 are positioned very close to together, or at least appear—from the vantage point of the eye—to be positioned close together. This is desirable in order to capture a RR image. A retinal retroreflection occurs when: (a) the eye (e.g., 101 in FIG. 2) is focused on a light source, such that light from the light source is focused to a blur spot on the retina; and (b) light reflects from the blur spot back to the camera. For example, light will reflect from the blur spot and travel back to the camera if: (a) light traveling from the light source to the retina is traveling in a first direction immediately before striking the pupil; (b) light traveling from the retina to the camera is traveling in a second direction immediately after exiting the pupil; and the (c) the first and second directions are almost parallel to each other.

In a simple case, the optical paths (from the light source to the eye, and from the eye to the camera) are straight. In that case, the light source and camera may be physically adjacent to each other, in order to capture a RR image.

In other cases, one or both of the optical paths (from the light source to the eye, or from the pupil to the camera) are bent. For example, this may occur due to relay optics (e.g., mirrors or lenses) bending one or both of the light paths. In these other cases, the light source and camera need not be physically adjacent to each other, as long as they appear—from the vantage point of the eye—to be adjacent to each other.

In some cases, the light source 107 emits visible light (in a wavelength range between 400 nm and 750 nm). The visible light may be either broadband or comprise one or more narrower bands of visible light. In many implementations: (a) the visible light includes reddish-orange light in a wavelength range between 590 nm to 750 nm; and (b) the retinal retroreflection appears as a reddish-orange region in the pupil. This reddish-orange region is typically disk-shaped.

In some cases, the light source 107 emits near infrared (NIR) light in a wavelength range between 800 nm and 1000 nm. For example, the peak intensity of the NIR light may be at 850 nm. An advantage of NIR light is that it is invisible to a human eye, and thus does not trigger the pupil to contract.

In some cases, the light source 107 emits continuous illumination. In other cases, the light source 107 may be pulsed to provide illumination that is synchronized with the camera exposures for the RR images. Pulsing the light has many advantages, including (a) increasing the intensity of illumination that may be safely used; and (b) thereby reducing the needed camera exposure time, which in turn mitigates movement artifacts such as blurring of the RR signal due to eye movement.

In some cases, the light source 107 emits incoherent light. For example, the light source 107 may include (a) an active light source, such as one or more light-emitting diodes (LEDs), that emits incoherent light; and (b) one or more optical elements (e.g., lenses or mirrors) that collimate the incoherent light.

In some cases, the light source 107 emits coherent light. For example, the light source 107 may comprise one or more lasers (e.g., laser diodes).

In some cases, the light source 107 emits collimated light. For example: (a) a laser may emit collimated light; (b) one or more optical elements may collimate incoherent light emitted by an LED; or (c) one or more optical elements may collimate uncollimated light emitted a laser. In some implementations: (a) the light source emits collimated light; (b) a computer detects, bases on sensor data, the position of the subject's eye or face; and (c) a computer controls one or more actuators to move the light source or other optical elements (such as mirrors or lenses) to cause the collimated light to be pointed at the eye or face.

The light source 107 that illuminates the retina during acquisition of the RR images may be implemented in many different ways. For example, in some cases, the light source 107 comprises one or more: (a) light emitting diodes (LEDs), laser diodes, or other solid-state light sources; (b) flash devices in which a capacitor rapidly discharges to power an LED, laser diode, or other solid-state light source; or (c) flash devices in which a capacitor rapidly discharges to power a flash tube. The light source may comprise an array of light sources. The light source may comprise a hybrid of two or more of the above-named lighting technologies. If the light source is pulsed, one or more computers may output signals to control the light source and camera such that camera exposures and light pulses are synchronized.

In many cases, irradiance received at the image sensor of the camera 103 will be at a global maximum when the eye 101 and camera 103 are each focused at an optical distance that is the same as the optical distance between the eye 101 and the light source 107, all other factors being equal. Thus, in many implementations, a visual fixation target (e.g., 105 in FIG. 2) tends to cause the eye to focus at an optical distance that is substantially equal to the optical distance between the camera 103 and eye 101.

In some cases, the optical distance of a visual fixation target from the eye is adjusted by adjusting the spherical power of a lens between the fixation target and the eye.

In illustrative implementations, the camera 103 and light source 107 subtend an angle, from the vantage point of the eye, that is less than 8 degrees, or less than 7 degrees, or less than 6 degrees, or less than 5 degrees, or less than 4 degrees, or less than 3 degrees, or less than 2 degrees, or less than 1 degree. This small angle allows the camera to capture an image of retroreflection from the retina. If the angle subtended by the camera 103 and light source 107 were greater than eight degrees, then the camera typically would not capture an image of retroreflection from the retina.

Display System

In illustrative implementations of this invention, a display system displays a fixation target for the eye to focus on. The fixation target may be a moving target that the eye tracks. Or the target may be stationary.

For example, in some cases, the display system displays a moving fixation target. The eye tracks the moving target. By controlling the position of the fixation target, the display system thereby controls the rotational position of the eye. For example, the moving fixation target may comprise a bright dot of light.

In other cases, the display system displays a stationary fixation target. For example, the stationary target may comprise lines of text. As a person reads the text, the person's eye rotates. The direction of the eye's gaze changes in a pattern that is predictable to some extent, in that the eye is likely to look at multiple words in the text, although not necessarily all of the words or in a particular order. In some cases: (a) a fixed pattern is displayed; and (b) a computer performs an algorithm that takes statistics of average gaze trajectories and an estimate of gaze position as inputs, and estimates eye orientation. For example, a fixed line of text may be shown to the subject on the display who will read it in a predictable pattern, providing the eye orientation estimation. A computer may then, based on the eye orientation, calculate position of the RR region, and in turn reconstruct an image of the retina.

In some alternative implementations, the display system displays visual content that a user would ordinarily be viewing, such as a video game, movie, interactive graphical content, or text (such as an email message, text message, or text displayed by an e-book reader device). In these alternative implementations, it is not assumed that the eye will be looking at a particular point of regard at a given time, and the probability of the eye doing so is not employed in calculations. Instead, as the user engages in the ordinary task: (a) the user's eye rotates; (b) the direction of gaze of the eye is tracked by a video-based eye tracker (e.g., 171 in FIG. 3A); and (c) a camera captures multiple RR images in different rotational positions of the eye.

Figure 3A:
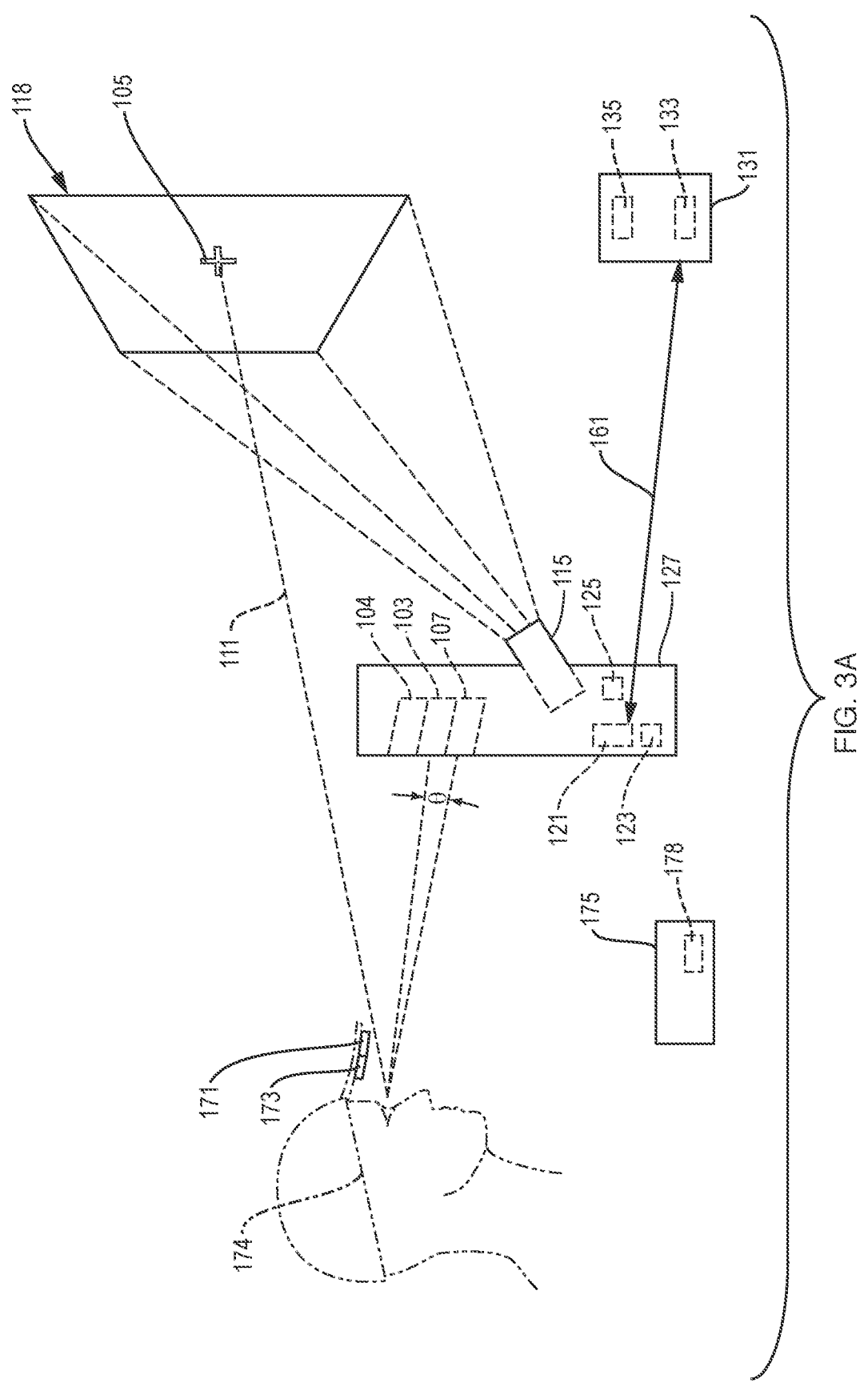
FIG. 3A shows a projector projecting a visual fixation target on a surface, while a light source illuminates the retina of an eye and a video camera captures an RR image.

In some cases, the display system comprises a digital projector (e.g., 115 in FIG. 3A). The digital projector 115 may project a fixation target pattern onto a surface. The video camera, light source, and projector may be housed together. Alternatively, the projector and video camera may be physically separated, and positioned such that the subject's eye is visible to the camera and the fixation target is visible to the subject.

The projector 115 projects the fixation target onto a reflective surface. The reflective surface may be either planar or curved.

In some cases, the projector 115 projects light onto a diffusely reflective surface, such as a wall or screen. An advantage of a diffusely reflective surface is that the light scatters from the surface toward the eye over a wide range of angles. Thus, the eye may be located in a wide range of positions and orientations relative to the surface and still receive reflected light from the digital projector.

In some other cases, the reflective surface is specular (e.g., a mirror). An advantage of a specular surface is that a greater percentage of light from the projector is reflected, and thus the light source may be less intense. If the surface is specular, it is desirable to orient the surface such that the light reflects in the direction of the eye. In some cases: (a) light from the light source is collimated; (b) the reflective surface is specular; (c) sensors detect 2D or 3D spatial position of the eye; and (d) actuators adjust the orientation of the specular surface such that the collimated light reflects toward the eye.

In some cases, the digital projector 115 comprises a digital video projector such as: (a) a CRT (cathode ray tube) projector; (b) an LCD (liquid crystal display) projector; (c) a DLP (digital light projector) or DMD (digital micromirror device) projector; (d) an LCoS (liquid crystal on silicon) projector; (e) an LED (light-emitting diode) projector; (e) a laser diode projector; or (f) a hybrid projector that combines one or more of the above projector technologies.

In other cases, the display system that displays the fixation target comprises a display screen (e.g., 160 in FIG. 4), such as a programmable billboard, programmable sign or computer monitor screen. The video camera and light source may be mounted at the edge of the display screen 160, with a computer to process images and change the display on the billboard. The display screen 160 may show a fixation target that moves in a raster pattern, or randomly moves or jumps to different sections of the screen.

For example, the display screen 160 that displays the fixation target may be a computer monitor screen that comprises: (a) a TFT-LCD (thin film transistor liquid crystal display); (b) a flat panel LED display; (c) an OLED (organic light emitting diode array); or (d) or an array of other solid-state light sources. Or, for example, the display screen may be a digital billboard or digital sign. The billboard or sign may comprise an array of LEDs or an array of other solid-state light sources. If the digital billboard or digital sign is located outdoors, the LEDs may be encapsulated in a material (such as a silicon gel) that protects the LEDs from moisture and humidity. Or, for example, the display screen may comprise: (a) a plasma display panel or other plasma display; (b) an electroluminescent display, (c) an LCD, such as thin-film transistor display or a high-performance addressing display; (d) an OLED display; (e) a CRT display; (f) an active matrix display; (g) a passive matrix display; (h) an autostereoscopic display, automultiscopic display, swept volume display, varifocal mirror display, emissive volume display, light field display or other volumetric display; (i) an animated or static holographic display; (j) an SED (surface-conduction electron-emitter display); (k) an FED (field emission display); (l) a laser television, (m) a carbon nanotube display, (n) a quantum dot display, (o) an IMOD (interferometric modulator) display; or (p) a screen that comprises an array of separately addressable reflective surfaces.

In some implementations of this invention, the display device (e.g., projector 115 or display screen 160) contains multiple, separately-addressable display pixels that are controlled by a computer.

In some cases, physical movement of an illumination source causes the fixation target to move. For example, the display system may comprise: (a) an active light source that is the fixation target; (b) one or more actuators for actuating physical motion of the active light source (fixation target); and (c) a computer for controlling movement of the actuators and intensity of the active light source. Here are four examples. First, a single linear actuator may move the active light source (that is the fixation target) along a single 1D axis. Second, two or three linear actuators may move the active light source (fixation target) along two or three axes, the axes being perpendicular to each other. For example, the active light source (fixation target) may be actuated by a two-axis translation stage, such as by mounting the fixation target on guide rails and translating the fixation target along the rails with a motor driven belt. Third, a robotic arm may move the active light source (fixation target). Fourth, a trained operator may manually power movement of the fixation target in a pre-defined trajectory In many implementations: (a) the fixation target tends to cause the eye to focus at a scene depth that is equal to the scene depth of the light source; and (b) thus, the fixation target appears to be at the same optical distance from the eye as the light source that illuminates the retina during camera exposures.

In many implementations, the display device displays the fixation target to both eyes of the user simultaneously. However, in some cases, the fixation target is presented to only one of the eyes of the user, such as the test eye (the eye whose retina is being imaged) or the other eye.

Direction of Gaze and Spatial Position of Eye

Gaze Direction: In illustrative implementations, it is desirable to determine the direction in which the eye is looking—or similarly, the eye's direction of gaze or the point of regard (the point in the scene at which the eye is gazing).

A Reason for Calculating Direction of Gaze: Once a computer calculates the eye's direction of gaze for a given RR image, a computer may determine—based on this direction of gaze (and, in many cases, on the known or calculated geometry of the scene) the precise location of the RR region captured in that image. This in turn allows a computer to reconstruct, from many small RR image regions, a reconstructed image of the retina. Advantageously, because the precise position of each RR region may be precisely determined from this direction of gaze (and from the known or calculated geometry of the scene), the image reconstruction may be performed without feature matching. In many implementations of this invention, feature matching (which would be needed for conventional image stitching) is unnecessary because a computer precisely calculates the location of the RR region based on this rotational position of the eye and on the known or calculated geometry of the scene.

Description of Gaze Direction: In illustrative implementations of this invention, a computer algorithm may describe the eye's direction of gaze—that is, rotational position—in many different ways. For example, the direction of gaze may be described by the spatial position of the eye and the spatial position of the point of regard. Or, for example, the eye's rotational position may be described in a coordinate system in which an axis of the coordinate system coincides with the camera's optical axis. Or, for example, the eye's rotational position may be described in an inertial coordinate system that is independent of both the eye and the camera. Or, for example, the eye's rotational position may be described by a zenith angle and azimuthal angle, where: (a) the zenith angle is the angle between the camera's effective viewing direction and the eye's optical axis; and (b) the azimuthal angle is an angle between the camera's effective viewing direction and a reference direction that is perpendicular to the eye's optical axis. For purposes hereof, a camera's "effective viewing direction" has the following meaning: (a) if the light path between the camera and eye is a straight line segment, then the camera's effective viewing direction is along that line segment, pointing toward the eye; and (b) if the light path between the camera and eye is bent (e.g., by mirrors or lenses), then the camera's effective viewing direction coincides with an exit path and points toward the eye. The exit path is a straight line segment along which light travels, immediately after exiting the pupil of the eye, before traveling to the camera.

Calculating Direction of Gaze: The eye's rotational position (direction of gaze) may be calculated in many different ways, depending on the particular implementation of this invention. Here are three examples. In the first two examples, direction of gaze is determined based in part on the position of a fixation target, because the eye is assumed to be looking at the fixation target. In the third example, direction of gaze is determined without the use of a fixation target.

First Example

In some implementations, the positions and orientation of a camera, projector and projection surface relative to each other are known by prior calibration. For example, they may be in a fixed position relative to each other. The projector projects a moving fixation target onto the projection surface. The angle (relative to the projector's optical axis) at which the projector projects the fixation target at any given time may be calculated. Based on this projection angle and the known positions and orientations of the projector and projection surface, a computer determines a spatial position of the moving fixation target on the projection surface. One or more sensors (e.g., cameras) gather data. A computer calculates, based on the sensor data, a spatial position of the subject's eye. The eye is assumed to be looking at the fixation target at all times. Based on the above information, a compute determines the direction of gaze of the eye. This computation of direction of gaze may be repeated separately for each RR image.

Second Example

In some implementations, the positions and orientation of a camera and display screen relative to each other are known by prior calibration. For example, they may be in a fixed position relative to each other. The display screen displays a moving fixation target. The position of the fixation target on the screen at any given time may be calculated. One or more sensors (e.g., cameras) gather data. A computer calculates, based on the sensor data, a spatial position of the subject's eye. The eye is assumed to be looking at the moving fixation target at all times. Based on the above information, a compute determines the direction of gaze of the eye.

Third Example

In some implementations, a user looks at a display screen such as a computer monitor screen, computer tablet screen, or screen of a video game console. The display screen displays visual content that changes over time, such as a video game, movie, or interactive graphical content (including text that a user reads or composes). Alternatively, the display screen displays content that is static for a prolonged period of the time.

In this third example (with either a changing or static display), the direction of gaze is calculated without assuming a fixation target. That is, the eye is not assumed to be looking at a particular fixation target at a given time. Instead, any existing gaze-tracking technology may be employed. For example, a video-based eye tracker (e.g., 171 in FIG. 3A) may determine direction of gaze. For example, the video-based eye tracker 171 may comprise one or more video cameras and a computer that processes video images captured by the camera. For example, the computer may process the video images to track first Purkinje images and the center of the pupil, in order to determine gaze direction. Or, for example, the computer may process the video images to track first Purkinje images and fourth Purkinje images, in order to determine gaze direction. The video-based eye tracker 171 may illuminate the eye with infrared (IR), near-infrared (NIR), or visible light.

In illustrative implementations of this invention, one or more sensors may detect a 1D, 2D, or 3D spatial position of the eye. For example, multiple cameras may capture images of a scene. Then a computer may perform a facial detection and tracking algorithm that processes the images to detect and track faces. Based on the fact that the cameras are viewing the scene from multiple angles, the 1D, 2D or 3D spatial position of the subject's face may be calculated. The 2D or 3D spatial position may be expressed in Cartesian coordinates.

For example, a face detection and tracking algorithm may (a) first, detect a face in an image, (b) identify a feature (e.g., a nose) in the face to track from frame to frame, and (c) track the feature from frame to frame. For example, a face may be detected based on skin tone, by performing cascade object detection with a trained classification model for detection. Then, for example, a histogram of a nose may be computed and the nose tracked from frame to frame.

In some implementations of this invention, a sensor may measure distance to the eye (or to the subject whose eye is being tested). Depth may be measured by any existing depth sensor 104, including (a) a stereo camera system (or other multi-camera system) that determines depth from images captured from different vantage points by two or more cameras; (b) a sensor that determines depth from structured illumination; (c) and time-of-flight sensors that measure depth based on phase difference between light emitted by the sensor and light received by the sensor.

Medical Diagnosis

In some implementations, this invention acquires images from a distance of more than 10 cm, for medical diagnostic purposes. For example, in some cases: (a) a camera acquires RR images at a distance of more than 10 cm; and (b) a computer takes the RR images as an input, and reconstructs images of the retina. In some cases, a computer then analyzes the reconstructed images in order to diagnose medical conditions that have pathology that is visible in the retina. These medical conditions include diabetic retinopathy, hypertension, glaucoma, cancer, and detached retina. For example, RR images may be acquired while a patient reads a document, and then a medical diagnosis made based on the reconstructed image of the retina.

Biometric Identification

In some implementations, this invention acquires images from a distance of more than 10 cm, for biometric identification purposes.

For example, a computer may compute a reconstructed image of the retina of a subject from many RR images, as described above. A computer may then compare this reconstructed image with a database of retinal images of many persons, in order to determine the identity of the subject.

Alternatively, a computer may use the RR images of very small RR regions for biometric identification, without reconstructing a digital image of the retina. For example, a computer may compare a set of multiple RR images of a subject, with a database of other sets of RR images. The different sets of RR images in the database correspond to different persons. Based on this comparison, a computer may determine the identity of the subject. (As noted above, in illustrative implementations, an individual RR image does not look like a zoomed version of a very small portion of the retina. Instead, if the camera has multiple pixels, each pixel of an RR image records light scattered at a different angle from a roughly lambertian reflector during retinal retroreflection. This roughly lambertian reflector is the very small RR region for that image).

In some cases, biometric identification of a person is made by recognizing a returning subject, whose retinal scan was taken on a prior visit. In other cases, a first time visitor may be identified by comparing a previously known retinal scan of that person.

In illustrative implementations of this invention, retinal scans for biometric identification may include a single gaze trajectory, such as tracking a target above a door (such as a row of LEDs above a door), or following the image of a bird flying across a screen. The RR image sequence may then be compared to a database for purposes of identification.

In illustrative implementations of this invention, biometric identification has many practical use scenarios. For example, it may allow a user to open doors, to unlock cars, to log in, to activate or run programs from a computer, or to perform secure authentication at gatherings (concerts, sporting events, airport lines). Or, for example, biometric identification may identify individuals on a crowded street, or may serve as ID for payment or proof of presence.

Gaze Tracking

In the biometric scenarios discussed above, a retinal image of an unknown subject is compared to a database of retinal images of known persons, in order to determine the identity of the subject.

Alternatively, the retinal images may be used for gaze tracking. For example, a computer may compare (a) a given retinal image of a known subject to (b) a database of retinal images of the known subject at different rotational positions of the eye, in order to determine the direction of gaze of the eye for the given retinal image.

With a known image of the subject's retina, this invention may be used to perform gaze tracking by matching expected retinal image with the received signal and determining the most likely eye orientation trajectory. For example, a subject may observe two icons on an information kiosk. A computer may estimate which icon the user is looking at, by comparing an acquired retinal image (derived from the RR images) and a known retinal image.

In some cases, with a known retinal image or previous scan, gaze may be estimated, such as by determining what icon or billboard region a user is looking at from a great distance, where other forms of eye tracking are not possible.

In some implementations of this invention, a computer determines gaze direction from a set of multiple RR images acquired as the eye's gaze direction moves along a predictable path. Using a set of multiple RR images acquired as the eye moves in a predictable path is desirable in order to accurately estimate of gaze direction. (In contrast, calculating gaze direction from only a single RR image is difficult, because any individual RR image may result from more than one gaze direction.)

Distance

In illustrative implementations of this invention, RR images are acquired while the camera is far away from the eye.

For example, in some implementations, the camera acquires the RR images at a distance from the eye that is: (a) at least 10 cm; (b) at least 50 cm; (c) at least 1 meter; (d) at least 3 meters; (e) at least 10 meters; (f) at least 100 meters; or (g) at least 1000 meters.

Indeed, in some cases, the camera acquires clear, detailed images of a subject's retina even when the subject is so far away from the camera that the rest of the face is below the diffraction threshold of the camera, and thus the rest of the face is not discernable in images captured by the camera. For example, clear, detailed images of the retina may be acquired at a distance of thousands of meters, when the subject's face (other than the retina) is not discernable.

This imaging from a distance exploits the fact that when the eye is focused on a distant point: (a) light exiting the eye is collimated by the eye's crystalline lens; and (b) the eye and the camera together form an optical system in which magnification is distance invariant—for example, magnification of the retina is the same at one centimeter as at thousands of meters. When the eye and camera are focused at optical infinity, the lens of the eye and the lens of the camera are at their focal lengths from the retina and image sensor of the camera, respectively. In that case, the magnification M of the optical system (eye and camera combined) is $M=f_c/f_e$, where $f_c$ is the focal length of the camera lens and $f_e$ is the focal length of the eye. As can be seen from this equation, the magnification is not affected by the distance between the camera and the eye. Thus, a camera may capture a magnified RR image even when the camera is at a great distance from the eye, such that the magnified RR image is above the diffraction limit of the camera but the rest of the subject's face is below the diffraction limit of the camera.

Thus, the RR images may be acquired from a great distance (such as thousands of meters), as long as the camera has sufficient resolution to capture the retinal retroreflection. In that case, an image of the retina may be reconstructed even if the face of the subject is below the diffraction limit, since the retinal retroflection signal corresponds to a small region of the retina for each eye orientation, even in the far field.

This ability to image the retina from great distances has many practical applications. For example, in some cases, this invention may be employed at a great distance (e.g., thousands of meters) for biometric identification or for determining a subject's direction of gaze. For example, this invention may acquire RR images of a subject at a distance and, based on those images, estimate the subject's direction of gaze and determine whether a user is looking at a distant billboard and what portion of the billboard the user is looking at.

In some cases, the image sensor of the camera 103 has only one pixel. This is particularly desirable when capturing RR images at a distance of more than 15 meters, in order to ensure that the camera has sufficient resolution to capture an RR image at that distance. A single pixel camera will have sufficient resolution to capture an RR image at a greater distance than a multi-pixel camera could, all other factors being equal.

Augmented Reality

In some implementations of this invention, the RR images are captured by a remote device (including a camera, light source and in some cases a display system) while a user wears an augmented reality (AR) headset. The AR headset includes a partially transmissive, partially reflective viewing surface that is positioned in front of the user's eyes. This AR viewing surface allows a user to look through the surface at the outside world while AR information is displayed on the surface. In some cases, light from the remote illumination source and remote fixation target passes through the AR viewing surface to the eye, and light from the eye passes through the AR viewing surface to the remote camera. In other cases, the AR headset itself displays the fixation target on the AR viewing surface, such that the fixation target appears—from the vantage point of the eye—to be at the same optical distance as the camera.

In some implementations of this invention, a user of a AR/VR (virtual reality) headset puts on device and authenticates their identification by tracking a target on the AR/VR screen/display. The camera and light source may be housed in the AR/VR headset, or housed separately at a distance (as described above regarding the see-through AR display).

Drawings

FIG. 1 shows an eye 101 rotating while a video camera 103 captures RR images. In FIG. 1, arrow 115 indicates rotation of the eye, and arrow 117 indicates that the optical axis 117 of the eye is also rotating.

Figure 2:
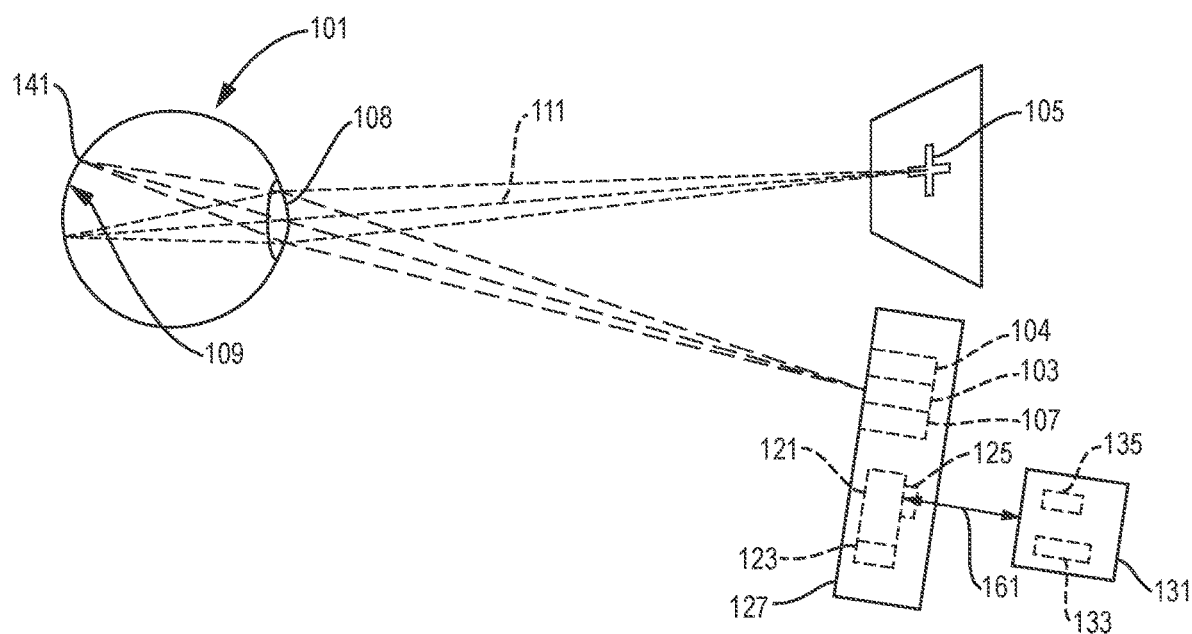
FIG. 2 shows an eye looking at a visual fixation target, while a light source illuminates the retina of the eye and a video camera captures an RR image.

FIG. 2 shows an eye looking at a visual fixation target, while a light source illuminates the retina of an eye and a video camera captures an RR image.

In the example shown in FIG. 2, retinal retroreflection occurs as follows: (a) an eye 101 is focused on fixation target 105; (b) fixation target 105 appears to the eye 101 to be at a particular optical distance; (c) the particular optical distance is substantially equal to the optical distance between the light source 107 and the eye 101; (d) the light source 107 is almost coaxial with the video camera 103; (e) the eye 101 converges light from the light source 107 to a small blur spot 141 on the retina 109; and (f) light scatters from this small blur spot 141 and travels to the video camera 103. Light enters and exits the eye 101 through the pupil 108.

Figure 4:
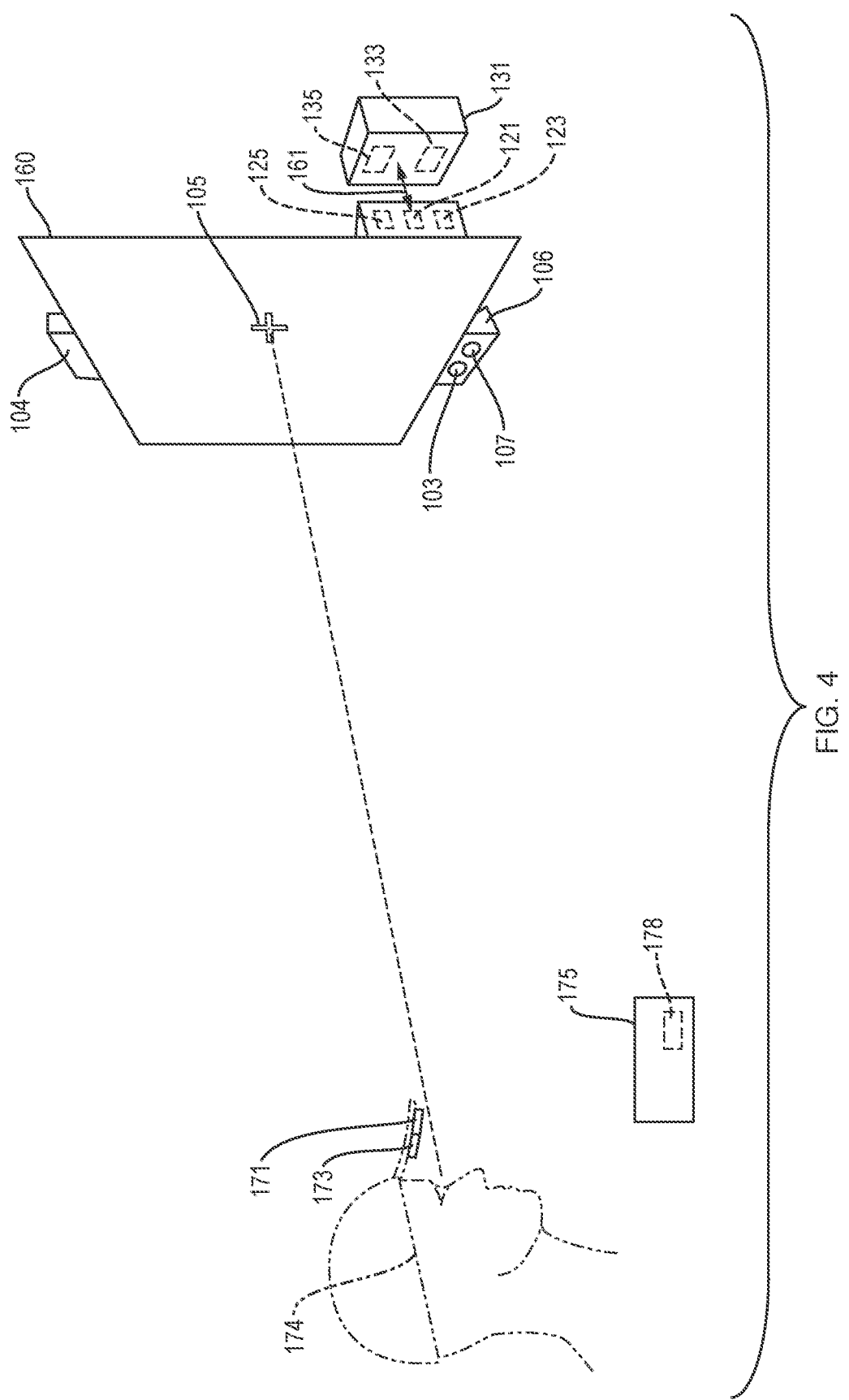
FIG. 4 shows a fixation target being displayed on a display screen, while a light source illuminates the retina of an eye and a video camera captures an RR image.

In FIGS. 2, 3A, and 4, the eye 101 focuses on the fixation target 105, while light source 107 illuminates retina 109 and video camera 103 captures an RR image. Also, a depth sensor 104 detects distance between depth sensor 104 and the eye 101 (or the person whose eye 101 is being imaged). An onboard computer 121 receives data from, and controls, the video camera 103, light source 107, depth sensor 104, and wireless communication module 125. A remote computer 131 communicates with onboard computer 121, via wired connection 161 or via wireless communication module 135. Remote computer 131 may, among other things, perform image processing and computer vision algorithms. Computers 121 and 131 read data from, and store data in, memory devices 123 and 133, respectively.

In the example shown in FIGS. 2 and 3A, many hardware components—such as video camera 103, light source 107, depth sensor 104, computer 121, memory device 123, and wireless communication module 125—are all housed together in housing 127.

FIG. 3A shows a projector 115 projecting a visual fixation target 105 on a surface 118.

Figure 3B:
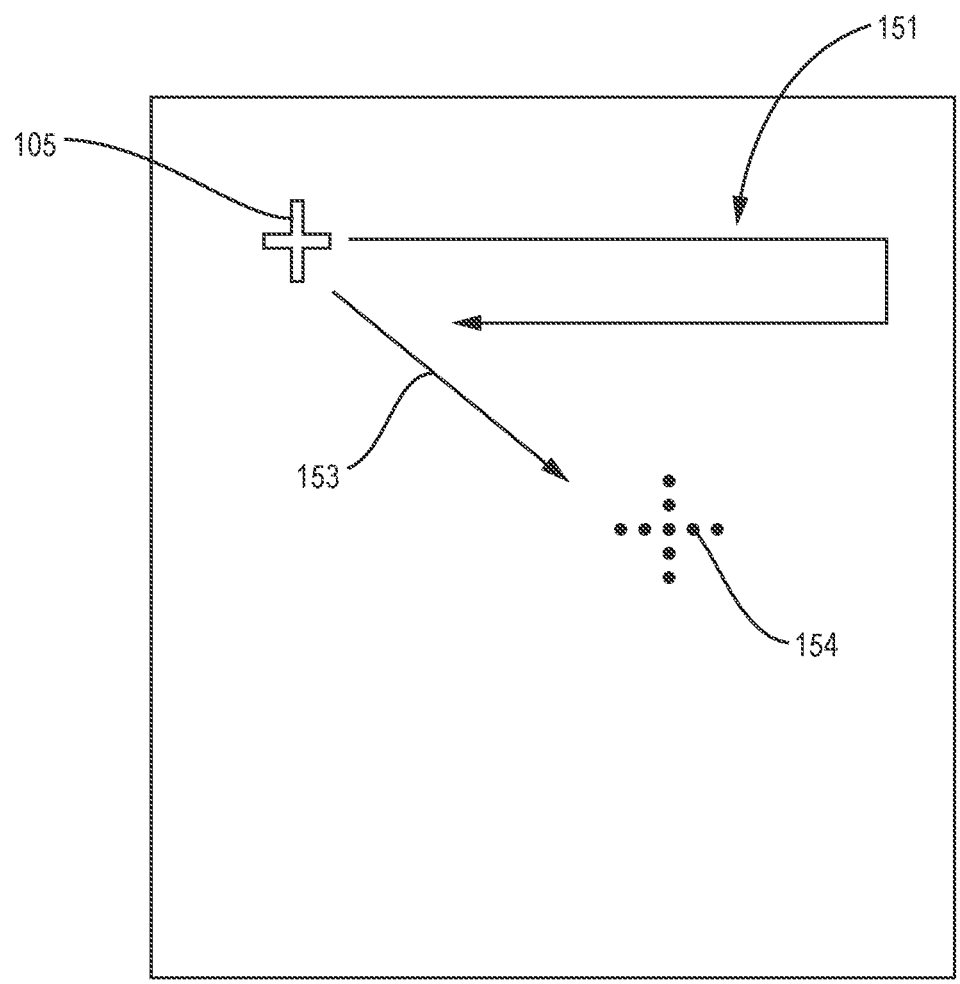
FIG. 3B shows a fixation target moving to different positions.

FIG. 3B shows a visual fixation target 105 moving to different positions. For example, projector 115 or display screen 160 may cause the fixation target 105 to move in a raster pattern 151, or to move to new positions (e.g. 154) in a straight line 153. In FIG. 3B, the fixation target 105 is projected onto projection surface 118 or displayed on display screen 160.

FIG. 4 shows a visual fixation target 105 being displayed on a display screen 160, while a light source 107 illuminates the retina of an eye and a video camera 103 captures an RR image. The video camera 103, light source 107 and depth sensor 104 are each positioned at or adjacent to the perimeter of the display screen 160.

In the examples shown in FIGS. 3 and 4, a user may carry or interact with an I/O device 175. For example, I/O device 175 may comprise a button. The user may input, via I/O device 175, instructions that cause computer 121 to initiate a sequence in which the video camera takes numerous RR images. I/O device 175 includes wireless communication module 178.

In the examples shown in FIGS. 3A and 4, the eye's direction of gaze is determined by calculations that assume that the eye is looking directly at the fixation target 105. In some cases, additional data regarding the eye's direction of gaze is gathered by a head-mounted eye tracker 171. Eye tracker 171 is supported by headwear 174 (e.g., a strap or hat) and communicates with computers (e.g., 121, 131) via a wireless communication module 173.

In the example shown in FIGS. 3A and 4, the fixation target 105 may be either moving or static.

Alternatively, in FIGS. 3A and 4, the display system (e.g., projector or display screen) may, instead of displaying a fixation target, display ordinary visual content (e.g., a movie, video game or text). In this alternative approach, the eye's direction of gaze is not determined by calculations that assume that the eye is looking at a particular fixation target at a given time. Instead, eye tracker 171 determines the eye's direction of gaze.

Figure 5:
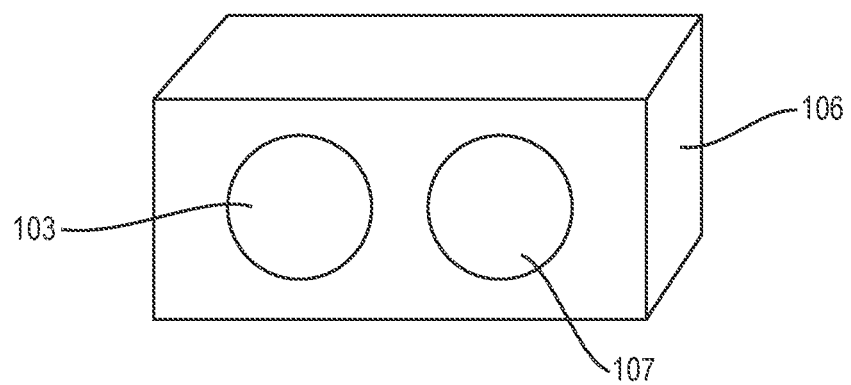
FIG. 5 shows a module that houses both a video camera and a light source.

FIG. 5 shows a module 106 that houses both a video camera 103 (for capturing RR images) and a light source 107 (for illuminating the retina while the RR images are captured). This module 106 may be positioned at, or adjacent to, a perimeter of a display screen (e.g., 160) or of a projection surface (e.g., 118).

Figure 6:
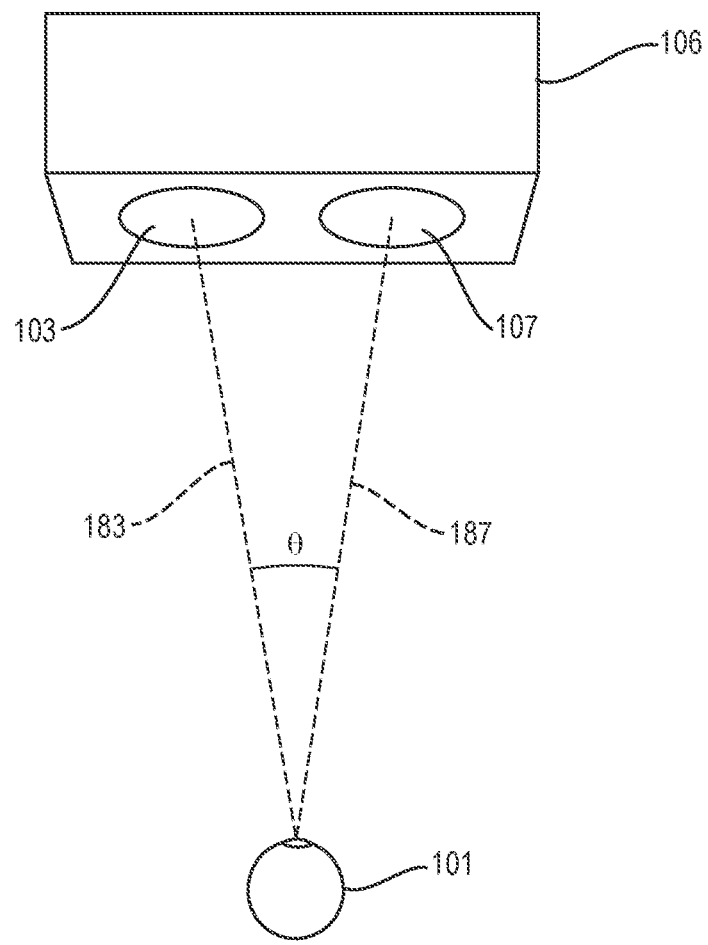
FIG. 6 shows that the camera and light source appear, from the vantage point of the eye, to be very close together.

FIG. 6 shows that the video camera 103 and light source 107 appear—from the vantage point of eye 101—to be very close together. That is, the angle θ between the optical axis 183 of the video camera 103 and the optical axis 187 of the light source 107 is so small that the camera 103 and light source 187 are substantially co-axial. The module 106 is sufficiently distant from eye 101 that, from the vantage point of eye 101, the number of steradians occupied by module 106 (including camera 103 and light source 107) is very small and thus camera 103 and light source 187 appear to be almost co-located. In FIGS. 3A and 6, the camera and light source subtend the angle θ, from the vantage point of the eye.

Figure 7:
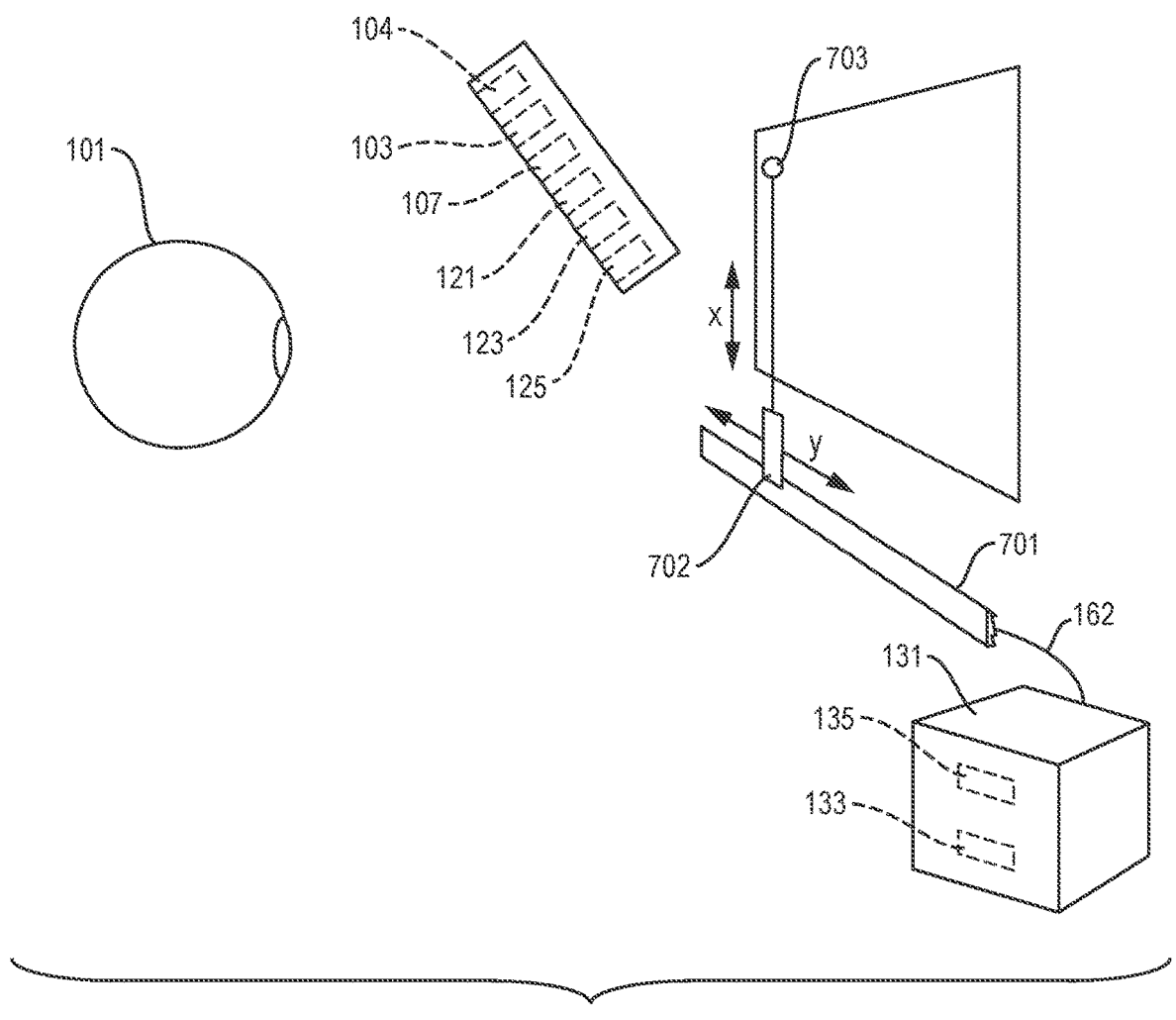
FIG. 7 shows actuators for moving an active light source that comprises a visual fixation target.

FIG. 7 shows actuators 701, 702 for moving an active light source that comprises a visual fixation target 703. Actuator 702 moves fixation target 703 in the x-direction, and actuator 701 moves fixation target 703 in the y-direction.

FIG. 8 shows a user wearing an augmented reality (AR) device 801, while a light source illuminates the retina of an eye and a video camera captures RR images. AR device 801 includes a see-through (i.e., partially transmissive, partially reflective) surface 803. Light reflects from the retina during retinal retroreflection and then passes through surface 803 and travels to a remote video camera 103, which captures RR images of that light.

Figure 9A:
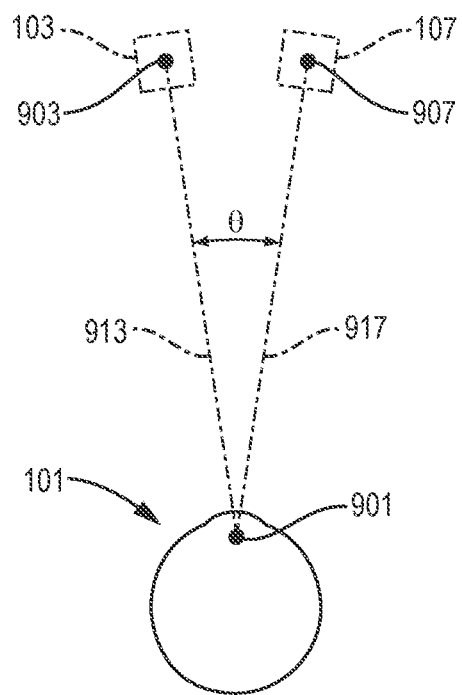
FIGS. 9A and 9B illustrate angles.
Figure 9B:
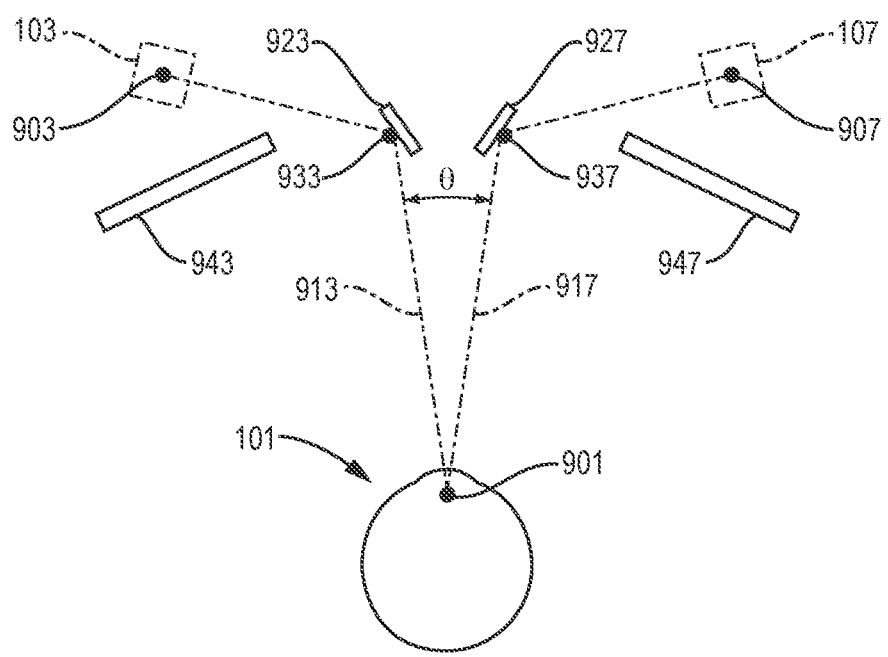

FIGS. 9A and 9B illustrate angles. In FIGS. 9A and 9B, the camera 103 and light source 107 subtend the angle θ, from the vantage point of the eye 101.

In FIG. 9A: (i) angle θ is an acute angle formed by a vertex, a first line segment and a second line segment; (ii) the vertex is the centroid 901 of the pupil of the eye; (iii) the first line segment 913 runs from the vertex to the centroid 903 of the aperture of the camera; and (iv) the second line segment 917 runs from the vertex to the centroid 907 of the light source.

In FIG. 9A, the light paths from the eye to the camera, and from the light source to the eye, are straight. Thus, in FIG. 9A, the eye and light source are where they appear to be, from the vantage point of the eye.

In contrast, in FIG. 9B, the light paths from the eye to the camera, and from the light source to the eye, are bent by mirrors 923, 927. Occluders 943, 947 prevent the eye 101 from seeing the actual physical position of points 903 and 907. In FIG. 9B, the centroid 903 of the aperture of the camera appears, from the vantage point of the eye, to be at point 933. Similarly, the centroid 907 of the light source appears, from the vantage point of the eye, to be at point 937.

Thus, in FIG. 9B: (i) angle θ is an acute angle formed by a vertex, a first line segment and a second line segment; (ii) the vertex is the centroid 901 of the pupil of the eye; (iii) the first line segment 913 runs from the vertex to point 933; and (iv) the second line segment 917 runs from the vertex to point 937.

In the example shown in FIG. 9B, the apparent positions of the camera and light source, from the vantage point of the eye, are altered by mirrors. Similarly, the apparent positions of the camera and light source, from the vantage point of the point of the eye, may be altered by refractive elements such as lenses or prisms.

The Figures are not necessarily drawn to scale. For example, angle θ in FIGS. 3A, 6, 9A and 9B is smaller than shown in those Figures. In illustrative implementations, angle θ is less than 8 degrees, or less than 7 degrees, or less than 6 degrees, or less than 5 degrees, or less than 4 degrees, or less than 3 degrees, or less than 2 degrees, or less than 1 degree.

Prototype

The following three paragraphs describe a prototype of this invention. This prototype is a non-limiting example of this invention. This invention may be implemented in many other ways.

In this prototype, the camera comprises a 16 mm focal length lens in front of a digital image sensor (CCD or CMOS). The light source (that illuminates the retina during image capture) comprises a 2 W 4000K LED located at the edge of the imaging lens pointing along the optical axis.

In one version of this prototype, the display system comprises a digital projector pointing in a direction 150 degrees from the imaging axis. The projector produces an image of a moving fixation target (small white dot) on a black background on a surface 5 m in front on it.

In another version of this prototype, the display system displays a 10 cm by 10 cm static image of a fixation target (small white dot). Actuators move an active light source that comprises a visual fixation target. The actuators mechanically translate the fixation target on a 10 cm by 10 cm 2-axis stage that is located next to the display system.

More Details

In some implementations of this invention, a camera and a nearby (close to camera lens) illumination source capture an image of a subject's eye, producing a retinal retroflection image ("RR image"). The subject's eye then rotates to look at different parts of a known pattern on a display. The geometry that relates eye rotation to camera location is known or calculated. A computer takes the RR images and known or calculated relative geometry as inputs, and then calculates a reconstructed image of the retina. Each change in eye rotation generates a RR signal from a different part of the retina.

In some cases, the image may be modeled (e.g., for reconstruction purposes) as a signal, indexed by eye rotation. As such, the signal may be used to approximate a 2D function that explains the measurements, and corresponds to all or part of an individual's retina:

$$S(\theta,\phi)=\Sigma_{p\in R}p=F_{\theta,\phi}+\Gamma_{\theta,\phi}+n \qquad \text{Equation 1}$$

In Equation 1, the sum of pixels, p, corresponding to the red-reflex, R, is equal to reflections from the fundus region, F, and corneal reflections, Γ, as well as a noise term, n. F and Γ are related to the eye anatomy, and with the corneal shape, known illumination and eye orientation, Γ may be estimated. The noise term, n, is dependent on the camera parameters.

As such, the pixels in images of the red reflex, p∈R, may be combined with samples of eye rotation under θ,φ to estimate F. The sampling over eye rotation may be sparse, and as such the measurement support for F may not enable perfect reconstruction of F, but the signal, S, is still useful for health and biometric applications.

In illustrative implementations of this invention, a moving visual fixation target causes an eye to track the target, and thereby facilitates sampling of S over a range of eye rotations (θ,φ).

In some implementations, an incoherent light source is close to the camera lens, and generates light rays that pass through the subject's pupil. The light rays originate from a single location, such as an LED, and appear to the subject as coming from a single spot at the same distance as the fixation target. The rays are then focused by the subject's eye, and scatter from a small part of the subject's retina. These scattered rays fill the pupil and appear as red-reflex in the camera images. In a simplified scenario for descriptive purposes, if the fixation target appeared to be at optical infinity, the subject's eye would focus to optical infinity. The incoherent illumination source is positioned so as to appear at optical infinity (rays parallel passing into subject's pupil). These rays are focused to a single blur spot, then scatter from the retina, and are then collimated by the eye. This makes the entire pupil appear red assuming approximately lambertian scattering by the retina. In other scenarios the fixation target may appear to be at a distance other than infinity, and the illumination source creates rays that appear to originate at that distance, thereby causing only a single blur spot on the retina to be illuminated. The red reflex thus corresponds to a single region of the retina. There are numerous optical configurations that may obtain this result.

In some implementations of this invention, a retinal imaging system comprises a camera, light source, display device (for displaying a fixation target), a computer (for, among other things, post-processing of images) and a user interface (which among other things, allows a user to control operation of the system).

In some implementations of this invention, a camera captures high resolution images of the retina at a far distance (e.g., greater than 10 cm) from the eye. In some cases, the camera does so at a greater distance than conventional retinal imagers, by exploiting optical properties of the eye and combining red reflex segments of images of the retina sampled at different angles.

In illustrative implementations of this invention, a camera samples the red reflex of the eye from numerous incident angles in order to construct an image of the retina.

In illustrative implementations, a display device displays a moving fixation target for a human user to look at. A light source illuminates the user's eyes, and a digital camera records video of the light reflected back by the retina. The sequence of video frames is then matched to the location of the moving fixation target and a complete image of the retina is recovered.

In illustrative implementations, tens, hundreds or thousands of images are taken. Due to the eye's optical system, the red-reflex portion of the images corresponds to a region of the retina that is the same in size as the focal spot size of the eye focused to infinity (4-10 microns). In post-processing, the red-reflex segments are detected. The red-reflex segments are combined into a single high resolution image of all or a portion of the retina of the eye. Thus, a high resolution image of the retina is captured at a far distance (e.g. greater than 10 cm). In some cases, multiple sweeps are performed to capture red-reflex images of a wide region of the retina.

In some implementations, the invention does not depend on the parameters of the imaging system as long as the camera's field of view (FOV) is greater than 10 degrees and the focal plane is at infinity.

In some implementations, the illumination system is collimated in the near field or produces collimated light in the far field.

In some implementations, the illumination system and imaging systems have a cross polarized configuration to eliminate specular reflections.

In some implementations, a single pixel detector is used instead of a CCD or CMOS digital image sensor.

In illustrative implementations, different gaze angles are captured while a user rotates an eye, as the user watches a moving fixation target. A camera samples the retina in the far field (>10 cm).

In illustrative implementations, the imaging system and illumination system are coaxial and located adjacent to each other. In some cases, the display system is located 15 degrees off axis from the imaging and illumination systems. A computer and user interface are located near the imaging system.

Computers

In exemplary implementations of this invention, one or more electronic computers (e.g. 121, 131) are programmed and specially adapted: (1) to control the operation of, or interface with, hardware components of a retinal retroreflection imaging system, including any video camera, light source, digital projector, display screen, eye tracker, depth sensor or actuator; (2) to calculate direction of gaze of any eye; (3) to calculate location of a RR region; (4) to combine multiple RR images to reconstruct a digital image of the retina; (5) to perform medical diagnosis based on the reconstructed retinal images; (6) to perform biometric identification based on the RR images or the reconstructed retinal images; (7) to perform gaze tracking based on the RR images or the reconstructed retinal images; (8) to perform any other calculation, computation, program, algorithm, or computer function described or implied above; (9) to receive signals indicative of human input; (10) to output signals for controlling transducers for outputting information in human perceivable format; and (11) to process data, to perform computations, to execute any algorithm or software, and to control the read or write of data to and from memory devices (items 1-11 of this sentence referred to herein as the "Computer Tasks"). The one or more computers may be in any position or positions within or outside of the retinal retroreflection imaging system. For example, in some cases (a) at least one computer is housed in or together with other components of the system, such as the video camera, light source, projector or display screen, and (b) at least one computer is remote from other components of the system. The one or more computers communicate with each other or with other components of the system either: (a) wirelessly, (b) by wired connection (e.g., 161, 162), (c) by fiber-optic link, or (d) by a combination of wired, wireless or fiber optic links.

In exemplary implementations, one or more computers are programmed to perform any and all calculations, computations, programs, algorithms, computer functions and computer tasks described or implied above. For example, in some cases: (a) a machine-accessible medium has instructions encoded thereon that specify steps in a software program; and (b) the computer accesses the instructions encoded on the machine-accessible medium, in order to determine steps to execute in the program. In exemplary implementations, the machine-accessible medium comprises a tangible non-transitory medium. In some cases, the machine-accessible medium comprises (a) a memory unit or (b) an auxiliary memory storage device. For example, in some cases, a control unit in a computer fetches the instructions from memory.

In illustrative implementations, one or more computers execute programs according to instructions encoded in one or more tangible, non-transitory, computer-readable media. For example, in some cases, these instructions comprise instructions for a computer to perform any calculation, computation, program, algorithm, or computer function described or implied above. For example, in some cases, instructions encoded in a tangible, non-transitory, computer-accessible medium comprise instructions for a computer to perform the Computer Tasks.

Network Communication

In illustrative implementations of this invention, an electronic device (e.g., 103, 104, 107, 171, 121, 131, 171) is configured for wireless or wired communication with other electronic devices in a network.

For example, in some cases, hardware components in the system (including a camera, light source, projector, display screen, depth sensor, eye tracker, I/O device and computers) each include a wireless communication module for wireless communication with other electronic devices in a network. Each wireless communication module (e.g., 125, 135, 173, 178) includes (a) one or more antennas, (b) one or more wireless transceivers, transmitters or receivers, and (c) signal processing circuitry. The wireless communication module receives and transmits data in accordance with one or more wireless standards.

In some cases, one or more of the following hardware components are used for network communication: a computer bus, a computer port, network connection, network interface device, host adapter, wireless communication module, wireless card, signal processor, modem, router, computer port, cables or wiring.

In some cases, one or more computers (e.g., 121, 131) are programmed for communication over a network. For example, in some cases, one or more computers are programmed for network communication: (a) in accordance with the Internet Protocol Suite, or (b) in accordance with any other industry standard for communication, including any USB standard, ethernet standard (e.g., IEEE 802.3), token ring standard (e.g., IEEE 802.5), wireless standard (including IEEE 802.11 (wi-fi), IEEE 802.15 (bluetooth/zigbee), IEEE 802.16, IEEE 802.20 and including any mobile phone standard.

I/O Devices

In illustrative implementations, a human inputs data or instructions via one or more I/O devices (e.g., 175).

For example, in some cases, the I/O devices comprise one or more of the following: touch screens, cameras, microphones, speakers, accelerometers, gyroscopes, magnetometers, inertial measurement units, pressure sensors, touch sensors, capacitive sensors, buttons, dials, sliders, transducers (e.g., haptic transducers), graphical user interfaces, electronic display screens, and projectors.

Actuators

In illustrative implementations, the RR imaging system includes actuators. For example, in some cases, one or more actuators translate an active light source that functions as a visual fixation target. Or, in some cases, one or more actuators: (a) rotate all or part of a projection surface; (b) rotate mirrors in a DLP projector; or (c) move one or more lenses in a zoom mechanism of a camera.

In illustrative implementations, each actuator (including each actuator for actuating any movement) is any kind of actuator, including a linear, rotary, electrical, piezoelectric, electro-active polymer, mechanical or electro-mechanical actuator. In some cases, the actuator includes and is powered by an electrical motor, including any stepper motor or servomotor. In some cases, the actuator includes a gear assembly, drive train, pivot, joint, rod, arm, or other component for transmitting motion. In some cases, one or more sensors are used to detect position, displacement or other data for feedback to one of more of the actuators.

Definitions

The terms "a" and "an", when modifying a noun, do not imply that only one of the noun exists.

An "active" light source means a light source that emits light and that does not merely reflect or transmit light from other sources.

To compute "based on" specified data means to perform a computation that takes the specified data as an input.

Here are some non-limiting examples of a "camera": (a) a digital camera; (b) a digital grayscale camera; (c) a digital color camera; (d) a video camera; (e) a light sensor or image sensor, (f) a set or array of light sensors or image sensors; (g) an imaging system; (h) a light field camera or plenoptic camera; (i) a time-of-flight camera; and (j) a depth camera. A camera includes any computers or circuits that process data captured by the camera.

The term "comprise" (and grammatical variations thereof) shall be construed as if followed by "without limitation". If A comprises B, then A includes B and may include other things.

The term "computer" includes any computational device that performs logical and arithmetic operations. For example, in some cases, a "computer" comprises an electronic computational device, such as an integrated circuit, a microprocessor, a mobile computing device, a laptop computer, a tablet computer, a personal computer, or a mainframe computer. In some cases, a "computer" comprises: (a) a central processing unit, (b) an ALU (arithmetic logic unit), (c) a memory unit, and (d) a control unit that controls actions of other components of the computer so that encoded steps of a program are executed in a sequence. In some cases, a "computer" also includes peripheral units including an auxiliary memory storage device (e.g., a disk drive or flash memory), or includes signal processing circuitry. However, a human is not a "computer", as that term is used herein.

"Defined Term" means a term or phrase that is set forth in quotation marks in this Definitions section.

For an event to occur "during" a time period, it is not necessary that the event occur throughout the entire time period. For example, an event that occurs during only a portion of a given time period occurs "during" the given time period.

The term "e.g." means for example.

"Equation 1" means Equation 1 above.

The fact that an "example" or multiple examples of something are given does not imply that they are the only instances of that thing. An example (or a group of examples) is merely a non-exhaustive and non-limiting illustration.

Unless the context clearly indicates otherwise, "existing" means existing on Apr. 28, 2016.

Unless the context clearly indicates otherwise: (1) a phrase that includes "a first" thing and "a second" thing does not imply an order of the two things (or that there are only two of the things); and (2) such a phrase is simply a way of identifying the two things, respectively, so that they each may be referred to later with specificity (e.g., by referring to "the first" thing and "the second" thing later). For example, unless the context clearly indicates otherwise, if an equation has a first term and a second term, then the equation may (or may not) have more than two terms, and the first term may occur before or after the second term in the equation. A phrase that includes a "third" thing, a "fourth" thing and so on shall be construed in like manner.

A "fixation target" or "visual fixation target" may be either moving or static.

To "focus" light does not require that the light converge to a single point. A non-limiting example of "focusing" light is to cause light to converge to a blur circle.

In the context of a camera, "front" is optically closer to the scene being imaged, and "rear" is optically farther from the scene, during normal operation of the camera. In the context of a display device, "front" is optically closer to a human viewer, and "rear" is optically farther from the viewer, when the viewer is viewing a display produced by the device during normal operation of the device. The "front" and "rear" of a display device continue to be the front and rear, even when no viewer is present.

"Herein" means in this document, including text, specification, claims, abstract, and drawings.

An "image of X" means an image that records at least X, but may also record other features of a scene. For example, an RR image of retroflection from the retina of the eye may also record other physical features, such as the sclera, eyelids and eyelashes.

As used herein: (1) "implementation" means an implementation of this invention; (2) "embodiment" means an embodiment of this invention; (3) "case" means an implementation of this invention; and (4) "use scenario" means a use scenario of this invention.

The term "include" (and grammatical variations thereof) shall be construed as if followed by "without limitation".

"Intensity" means any measure of or related to intensity, energy or power. For example, the "intensity" of light includes any of the following measures: irradiance, spectral irradiance, radiant energy, radiant flux, spectral power, radiant intensity, spectral intensity, radiance, spectral radiance, radiant exitance, radiant emittance, spectral radiant exitance, spectral radiant emittance, radiosity, radiant exposure or radiant energy density.

"I/O device" means an input/output device. Non-limiting examples of an I/O device include a touch screen, other electronic display screen, keyboard, mouse, microphone, handheld electronic game controller, digital stylus, display screen, speaker, or projector for projecting a visual display.

"Light" means electromagnetic radiation of any frequency. For example, "light" includes, among other things, visible light and infrared light. Likewise, any term that directly or indirectly relates to light (e.g., "imaging") shall be construed broadly as applying to electromagnetic radiation of any frequency.

The term "or" is inclusive, not exclusive. For example, A or B is true if A is true, or B is true, or both A or B are true. Also, for example, a calculation of A or B means a calculation of A, or a calculation of B, or a calculation of A and B.

A parenthesis is simply to make text easier to read, by indicating a grouping of words. A parenthesis does not mean that the parenthetical material is optional or may be ignored.

"Reddish-orange range" means a range of wavelengths of light that is greater than or equal to 590 nm and less than or equal to 750 nm.

As used herein, "retinal retroflection" or "RR" means reflection in which (i) a camera and a light source subtend an angle, from the vantage point of an eye, that is less than eight degrees; and (b) light from the light source travels to the retina of the eye, and then scatters from the retina, such that a portion of the scattered light travels to the light source and a portion of the scattered light travels to the camera.

"Retinal retroreflection image" or "RR image" means a digital image that records a retinal retroflection.

"Retinal retroreflection region" or "RR region" means a region of a retina, from which region light scatters as a retinal retroreflection.

A "temporal sequence" means a sequence, the elements of which are in chronological order or inverse chronological order.

To say that a camera and a light source "subtend an angle" of X degrees from the vantage point of an eye means that an acute angle is X degrees, where (i) the acute angle is formed by a vertex, a first line segment and a second line segment, (ii) the vertex is the centroid of the pupil of the eye, (iii) the first line segment runs from the vertex to the centroid of the aperture of the camera, and (iv) the second line segment runs from the vertex to the centroid of the light source. For purposes of the preceding sentence, the centroid of the aperture and the centroid of the light source are treated as being in the spatial position that they appear to be in, from the vantage point of the eye.

"Some" means one or more.

As used herein, a "subset" of a set consists of less than all of the elements of the set.

To say that X and Y are "substantially equal" means that: (a) if X is greater than or equal to Y, then the absolute value of the difference between X and Y is less than ten percent of Y; and (b) if X is less than Y, then the absolute value of the difference between X and Y is less than ten percent of X. For example: (a) 112 is not substantially equal to 100; and (b) 108 is substantially equal to 100.

The term "such as" means for example.

To say that a machine-readable medium is "transitory" means that the medium is a transitory signal, such as an electromagnetic wave.

Except to the extent that the context clearly requires otherwise, if steps in a method are described herein, then the method includes variations in which: (1) steps in the method occur in any order or sequence, including any order or sequence different than that described; (2) any step or steps in the method occurs more than once; (3) different steps, out of the steps in the method, occur a different number of times during the method, (4) any combination of steps in the method is done in parallel or serially; (5) any step or steps in the method is performed iteratively; (6) a given step in the method is applied to the same thing each time that the given step occurs or is applied to different things each time that the given step occurs; or (7) the method includes other steps, in addition to the steps described.

This Definitions section shall, in all cases, control over and override any other definition of the Defined Terms. For example, the definitions of Defined Terms set forth in this Definitions section override common usage or any external dictionary. If a given term is explicitly or implicitly defined in this document, then that definition shall be controlling, and shall override any definition of the given term arising from any source (e.g., a dictionary or common usage) that is external to this document. If this document provides clarification regarding the meaning of a particular term, then that clarification shall, to the extent applicable, override any definition of the given term arising from any source (e.g., a dictionary or common usage) that is external to this document. To the extent that any term or phrase is defined or clarified herein, such definition or clarification applies to any grammatical variation of such term or phrase, taking into account the difference in grammatical form. For example, the grammatical variations include noun, verb, participle, adjective, and possessive forms, and different declensions, and different tenses. In each case described in this paragraph, the Applicant or Applicants are acting as his, her, its or their own lexicographer.

Variations

This invention may be implemented in many different ways. Here are some non-limiting examples:

In some implementations, this invention is a method comprising: (a) a camera capturing, while an eye of a subject rotates, a set of retinal retroreflection images (RR images) of the retina of the eye, such that rotational position of the eye varies from image to image in the set of images; and (b) one or more computers calculating, for each respective image in the set of RR images (i) direction of gaze of the eye when the respective image was captured, and (ii) the position of a retinal retroreflection region (RR region) that reflected light, which light comprises a retinal retroreflection recorded in the respective image. In some cases, for each respective image in the set of RR images, the one or more computers calculate the position of the RR region, based at least in part on the direction of gaze. In some cases: (a) the one or more computers perform a computation in order to calculate a digital image of a portion of the retina; and (b) the computation includes, for each respective pixel of the digital image, setting the intensity of the respective pixel equal to a value, which value is the sum of a set of light intensities that correspond to the respective pixel and that are recorded in the RR images. In some cases, the one or more computers analyze the digital image to diagnose a disease of the subject. In some cases, the one or more computers compare the digital image to a database of retinal images, in order to determine the identity of the subject. In some cases, the one or more computers compare the set of RR images to a database of sets of RR images, in order to determine the identity of the subject. In some cases, the one or more computers: (a) control a display screen, such that the display screen displays a moving fixation target; and (b) compute direction of gaze of the eye, based at least in part on position of the fixation target. In some cases: (a) the set of RR images include a temporal sequence of RR images; and (b) the one or more computers compare the temporal sequence of RR images to a database of other temporal sequences of RR images of the retina of the subject, in order to calculate a temporal sequence of directions of gaze of the eye. In some cases: (a) the camera captures the RR images while the camera is more than fifteen meters from the eye; and (b) the camera has only one pixel. In some cases: (a) the camera has a diffraction limit; and (b) the camera captures a magnified RR image of the retina, while the camera is sufficiently distant from the eye such that (i) the face of the subject, other than the retina, is below the diffraction limit of the camera, and (ii) the magnified RR image of the retina is above the diffraction limit of the camera. In some cases: (a) a light source emits visible light that illuminates the retina during the capturing of the set of RR images; and (b) the retinal retroreflection comprises a red reflex reflection. In some cases: (a) a light source emits infrared light that illuminates the retina during the capturing of the set of RR images; and (b) the retinal retroreflection comprises a bright pupil reflection. In some cases, the camera captures the RR images while the camera is more than ten centimeters from the eye. Each of the cases described above in this paragraph is an example of the method described in the first sentence of this paragraph, and is also an example of an embodiment of this invention that may be combined with other embodiments of this invention.

In some implementations, this invention is a method comprising: (a) a camera capturing, while an eye of a subject rotates, a set of retinal retroreflection images (RR images) of the retina of the eye, such that rotational position of the eye varies from image to image in the set of images; (b) a light source illuminating the retina during the capturing of the set of RR images; and (c) one or more computers calculating, for each respective image in the set of RR images (i) direction of gaze of the eye when the respective image was captured, and (ii) the position of a retinal retroflection region (RR region) that reflected light, which light comprises a retinal retroreflection recorded in the respective image. In some cases: (a) the light source emits visible light that illuminates the retina during the capturing of the set of RR images; and (b) the retinal retroreflection comprises a red reflex reflection. In some cases: (a) the light source emits infrared light that illuminates the retina during the capturing of the set of RR images; and (b) the retinal retroreflection comprises a bright pupil reflection. In some cases, the camera captures the RR images while the camera is more than ten centimeters from the eye. Each of the cases described above in this paragraph is an example of the method described in the first sentence of this paragraph, and is also an example of an embodiment of this invention that may be combined with other embodiments of this invention.

In some implementations, this invention is an apparatus comprising: (a) a camera for capturing, while an eye of a subject rotates, a set of retinal retroreflection images (RR images) of the retina of the eye, such that rotational position of the eye varies from image to image in the set of images; and (b) one or more computers that are programmed to calculate, for each respective image in the set of RR images (i) direction of gaze of the eye when the respective image was captured, and (ii) the position of a retinal retroflection region (RR region) that reflected light, which light comprises a retinal retroreflection recorded in the respective image. In some cases, the one or more computers are programmed, for each respective image in the set of RR images, to calculate the position of the RR region, based at least in part on the direction of gaze. In some cases: (a) the one or more computers are programmed to perform a computation in order to calculate a digital image of a portion of the retina; and (b) the computation includes, for each respective pixel of the digital image, setting the intensity of the respective pixel equal to a value, which value is the sum of a set of light intensities that correspond to the respective pixel and that are recorded in the RR images. In some cases, the one or more computers are programmed to analyze the digital image to diagnose a disease of the subject. In some cases, the one or more computers are programmed to compare the digital image to a database of retinal images, in order to determine the identity of the subject. In some cases: (a) the camera is configured to capture the RR images while the camera is more than fifteen meters from the eye; and (b) the camera has only one pixel. In some cases, the apparatus includes a light source for emitting infrared light that illuminates the retina during capture of the set of RR images. In some cases: (a) the camera has a diffraction limit; and (b) the camera is configured to capture a magnified RR image of the retina, while the camera is sufficiently distant from the eye such that (i) the face of the subject, other than the retina, is below the diffraction limit of the camera, and (ii) the magnified RR image of the retina is above the diffraction limit of the camera. In some cases: (a) the apparatus includes a projector; and (b) the one or more computers are programmed (i) to control the projector, such that the projector projects a moving fixation target on a surface, and (ii) to compute direction of gaze of the eye, based at least in part on position of the fixation target. In some cases: (a) the apparatus includes a display screen; and (b) the one or more computers are programmed (i) to control the display screen, such that the display screen displays a moving fixation target, and (ii) to compute direction of gaze of the eye, based at least in part on position of the fixation target. In some cases: (a) the apparatus includes a light source for emitting visible light that illuminates the retina during capture of the set of RR images; and (b) the retinal retroreflection comprises a red reflex reflection. In some cases: (a) the apparatus includes a light source for emitting infrared light that illuminates the retina during capture of the set of RR images; and (b) the retinal retroreflection comprises a bright pupil reflection. In some cases, the camera is configured to capture the RR images while the camera is more than ten centimeters from the eye. Each of the cases described above in this paragraph is an example of the apparatus described in the first sentence of this paragraph, and is also an example of an embodiment of this invention that may be combined with other embodiments of this invention.

In some implementations, this invention is an apparatus comprising: (a) a camera capturing, while an eye of a subject rotates, a set of retinal retroreflection images (RR images) of the retina of the eye, such that rotational position of the eye varies from image to image in the set of images; (b) a light source for illuminating the retina during the capturing of the set of RR images; and (c) one or more computers that are programmed to calculate, for each respective image in the set of RR images (i) direction of gaze of the eye when the respective image was captured, and (ii) the position of a retinal retroreflection region (RR region) that reflected light, which light comprises a retinal retroreflection recorded in the respective image. In some cases: (a) the light source is configured to emit visible light that illuminates the retina during the capturing of the set of RR images; and (b) the retinal retroreflection comprises a red reflex reflection. In some cases: (a) the light source is configured to emit infrared light that illuminates the retina during the capturing of the set of RR images; and (b) the retinal retroreflection comprises a bright pupil reflection. In some cases, the camera is configured to capture the RR images while the camera is more than ten centimeters from the eye. Each of the cases described above in this paragraph is an example of the apparatus described in the first sentence of this paragraph, and is also an example of an embodiment of this invention that may be combined with other embodiments of this invention.

The above description (including without limitation any attached drawings and figures) describes illustrative implementations of the invention. However, the invention may be implemented in other ways. The methods and apparatus which are described above are merely illustrative applications of the principles of the invention. Other arrangements, methods, modifications, and substitutions by one of ordinary skill in the art are therefore also within the scope of the present invention. Numerous modifications may be made by those skilled in the art without departing from the scope of the invention. Also, this invention includes without limitation each combination and permutation of one or more of the abovementioned implementations, embodiments and features.

What is claimed is:
1. A method comprising:
(a) capturing a set of retinal retroreflection images (RR images) of the retina of an eye of a person, in such a way that rotational position of the eye varies from image to image in the set of images;
(b) for each respective RR image in the set of RR images
   (i) calculating an estimate of direction of gaze of the eye, which direction of gaze occurs when the respective RR image is captured, and
   (ii) calculating, based on the estimate of direction of gaze, the position, relative to the retina, of a retinal retroreflection region (RR region) that reflected light recorded in the respective RR image; and
(c) summing data from the set of RR images to compute a digital image of a portion of the retina;
wherein the summing comprises, for each respective pixel of the digital image, setting the intensity of the respective pixel equal to a value, which value is the sum of a set of light intensities that correspond to the respective pixel and that are recorded in the RR images.

2. Apparatus comprising:
(a) a camera; and
(b) one or more computers;
wherein
(i) the camera is configured to capture a set of retinal retroreflection images (RR images) of the retina of an eye of a person, in such a way that rotational position of the eye varies from image to image in the set of images, and
(ii) the one or more computers are programmed
   (A) to calculate, for each respective RR image in the set of RR images
      (I) direction of gaze of the eye, which direction of gaze occurs when the respective RR image is captured, and
      (II) the position, relative to the retina, of a retinal retroreflection region (RR region) that reflected light recorded in the respective RR image, and
   (B) to perform a computation that sums data from the set of RR images to generate a digital image of a portion of the retina, which computation involves, for each respective pixel of the digital image, setting the intensity of the respective pixel equal to a value, which value is the sum of a set of light intensities that correspond to the respective pixel and that are recorded in the RR images.

3. Apparatus comprising:
(a) a camera; and
(b) one or more computers;
wherein
(i) the camera is configured to capture a set of retinal retroreflection images (RR images) of the retina of an eye, in such a way that rotational position of the eye varies from image to image in the set of images,
(ii) the one or more computers are programmed, for each respective RR image in the set of RR images
   (A) to calculate an estimate of direction of gaze of the eye, which direction of gaze occurs when the respective RR image is captured, and
   (B) to calculate, based on the estimate of direction of gaze, the position, relative to the retina, of a retinal retroreflection region (RR region) that reflected light recorded in the respective RR image, and
(iii) the one or more computers are further programmed to perform a computation that sums data from the set of RR images to generate a digital image of a portion of the retina, which computation involves, for each respective pixel of the digital image, setting the intensity of the respective pixel equal to a value, which value is the sum of a set of light intensities that correspond to the respective pixel and that are recorded in the RR images.

* * * * *